US011763553B2

(12) United States Patent
Browne

(10) Patent No.: US 11,763,553 B2
(45) Date of Patent: Sep. 19, 2023

(54) ARTIFICIAL INTELLIGENCE ADVANCE IMAGING—PROCESSING CONDITIONED LIGHT PHOTOGRAPHY AND VIDEOGRAPHY TO REVEAL FEATURES DETECTABLE BY OTHER ADVANCED IMAGING AND FUNCTIONAL TESTING TECHNOLOGIES

(71) Applicant: THE REGENTS OF THE UNIVERSITY OF CALIFORNIA, Oakland, CA (US)

(72) Inventor: Andrew Browne, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 294 days.

(21) Appl. No.: 16/845,434

(22) Filed: Apr. 10, 2020

(65) Prior Publication Data
US 2020/0336638 A1 Oct. 22, 2020

Related U.S. Application Data

(60) Provisional application No. 62/835,163, filed on Apr. 17, 2019.

(51) Int. Cl.
| | |
|---|---|
| *G06V 10/774* | (2022.01) |
| *G06V 20/10* | (2022.01) |
| *G06T 7/55* | (2017.01) |
| *G06T 7/30* | (2017.01) |
| *G06V 10/82* | (2022.01) |
| *G06V 10/143* | (2022.01) |

(Continued)

(52) U.S. Cl.
CPC ............ *G06V 20/10* (2022.01); *G06F 18/214* (2023.01); *G06N 20/00* (2019.01); *G06T 3/4038* (2013.01);
(Continued)

(58) Field of Classification Search
None
See application file for complete search history.

(56) References Cited

U.S. PATENT DOCUMENTS

| 10,664,722 B1 * | 5/2020 | Sharma | G06N 3/045 |
|---|---|---|---|
| 2011/0052038 A1 * | 3/2011 | Hayashi | G06T 7/11 |
| | | | 382/133 |

(Continued)

OTHER PUBLICATIONS

Kniaz, V. V., and V. A. Mizginov. "Thermal Texture Generation and 3D Model Reconstruction Using SFM and GAN." International Archives of the Photogrammetry, Remote Sensing & Spatial Information Sciences 42.2 (2018). (Year: 2018).*

(Continued)

*Primary Examiner* — Sean M Conner
(74) *Attorney, Agent, or Firm* — Smith, Gambrell & Russell LLP

(57) ABSTRACT

Embodiments of the present systems and methods may provide imaging techniques for multidirectional imaging, light conditioning, illumination sequences, or machine learning to create algorithms created from training by other advanced imaging techniques. In an embodiment, a method for generating an image may comprise obtaining an image of an object produced by a camera and generating, from the obtained image produced by a conventional camera, using an artificial intelligence model and imaging process, an output image including additional information similar to additional information present in an image of the object produced by an advanced imaging system.

13 Claims, 9 Drawing Sheets

(51) Int. Cl.
*G06T 3/40* (2006.01)
*G06N 20/00* (2019.01)
*G06F 18/214* (2023.01)
*H04N 23/45* (2023.01)
*H04N 23/71* (2023.01)
*G06V 10/764* (2022.01)
*G06V 10/147* (2022.01)
*H04N 23/56* (2023.01)

(52) U.S. Cl.
CPC .................. *G06T 7/30* (2017.01); *G06T 7/55* (2017.01); *G06V 10/143* (2022.01); *G06V 10/147* (2022.01); *G06V 10/764* (2022.01); *G06V 10/82* (2022.01); *H04N 23/45* (2023.01); *H04N 23/71* (2023.01); *G06T 2207/10036* (2013.01); *G06T 2207/20081* (2013.01); *G06V 20/194* (2022.01); *H04N 23/56* (2023.01)

(56) References Cited

U.S. PATENT DOCUMENTS

| | | | |
|---|---|---|---|
| 2019/0066288 A1* | 2/2019 | Dudzik | G01N 21/8851 |
| 2019/0378012 A1* | 12/2019 | Tripodi | G01B 11/02 |
| 2019/0384047 A1* | 12/2019 | Johnson | G06T 7/187 |
| 2019/0385282 A1* | 12/2019 | Sasaki | G06T 5/50 |
| 2022/0058803 A1* | 2/2022 | Bhattacharya | G06T 5/50 |
| 2022/0108543 A1* | 4/2022 | Niehaus | G01N 21/84 |

OTHER PUBLICATIONS

Lee, Gyuhyun, et al. "DeepHCS: bright-field to fluorescence microscopy image conversion using deep learning for label-free high-content screening." International Conference on Medical Image Computing and Computer-Assisted Intervention. Springer, Cham, 2018. (Year: 2018).*

* cited by examiner

ARTIFICIAL INTELLIGENCE ADVANCE IMAGING—PROCESSING CONDITIONED LIGHT PHOTOGRAPHY AND VIDEOGRAPHY TO REVEAL FEATURES DETECTABLE BY OTHER ADVANCED IMAGING AND FUNCTIONAL TESTING TECHNOLOGIES

CROSS-REFERENCE TO RELATED APPLICATIONS

This application claims the benefit of priority to U.S. Provisional Patent Application No. 62/835,163 filed on Apr. 17, 2019, which is incorporated by reference in its entirety herein.

TECHNICAL FIELD OF THE INVENTION

The present invention relates to imaging devices and method of imaging for capturing high resolution images of samples under many lighting conditions to create an image dataset that may be used to determine physical or functional characteristics of the sample.

BACKGROUND OF THE INVENTION

Hyperspectral imaging captures data of a sample at different wavelengths of illumination. In medical applications, hyperspectral cameras use multiple wavelengths of light to capture photographs of superficial and deep tissues with the purpose of human image review. For example, in retina photography, the Annidis RHA provided advanced retinal multi-spectral imaging to provide progressive examination of different depths in the retina and choroid. Likewise, a dual spectrum camera may acquire images of tissues at two wavelengths to determine blood oximetry.

However, these device have not experienced adoption and companies like Annidis have dissolved. Diffuse light imaging systems are less costly and easier to reduce their size than laser based imaging systems. A need arises for imaging devices that may provide multidirectional imaging, light conditioning, illumination sequences, scanning light beam, or machine learning to enhance the capabilities of imaging methods.

SUMMARY OF THE INVENTION

Embodiments of the present systems and methods may provide imaging techniques for multidirectional imaging, light conditioning, illumination sequences, or machine learning to create algorithms created from training from data generated by other advanced imaging techniques. Therefore, existing advanced imaging technologies, such as scanning lasers imaging, can acquire images that are used to train machine learning tools to extract information from conditioned light imaging sources and reconstruct similar information acquired from advanced imaging techniques.

In an embodiment, a method for generating an image may comprise obtaining an image of an object produced by a camera and generating, from the obtained image produced by a, for example, conventional camera, using an artificial intelligence model and imaging process, an output image including additional information similar to additional information present in an image of the object produced by an advanced imaging or data collection system.

In embodiments, the artificial intelligence model and imaging process may be generated by obtaining a plurality of images of at least one training object of a type similar to the object, using the camera, obtaining a plurality of images of the at least one training object acquired using the advanced imaging device, the advanced imaging device generating images having additional information relative to information in an image produced by the camera, training a machine learning model, using the plurality of images of the at least one training object obtained using the camera and the plurality of images of the at least one training object obtained using the advanced imaging device, to extract the additional information similar to the additional information present in an image of the object produced by an advanced imaging system and generating an artificial intelligence model and process, using the machine learning model, the artificial intelligence model and process adapted to receive images of object produced by the camera and generate output images including additional information similar to additional information present in images of the object produced by an advanced imaging system. The camera may comprise a multi-condition light camera adapted to output light including multiple forms of conditioned light and to capture images using the multiple forms of conditioned light. The multiple forms of conditioned light may comprise at least one of spectral regions of visible light, infrared light, or ultraviolet light, and the light has been filtered using at least one of a wavelength or color filter, a polarity or polarization filter, an intensity filter, a directionality filter, light shaping, and light beam actuation. The advanced imaging device, in the example application of ophthalmic testing, may comprise at least one of a planar imaging, 3-dimensional imaging, or tomography device, an x-ray, a magnetic resonance imaging device, a confocal laser scanning microscope, an optical coherence tomography device, an ultrasound device, an adaptive optics device, a fluorescence imaging device, a functional magnetic resonance imaging device, an angiography device, visual function testing device a perimetry device, a functional imaging device, or an advanced testing device not yet available. The method may further comprise aligning, registering, and storing the plurality of images.

In an embodiment, a system for generating an image may comprise a camera adapted to capture an image of an object and a computer system comprising a processor, memory accessible by the processor, and computer program instructions and data stored in the memory so as to enable the processor to implement generating, from the obtained image produced by a camera, using an artificial intelligence model and imaging process, an output image including additional information similar to additional information present in an image of the object produced by an advanced imaging system.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide imaging techniques for multidirectional imaging, light conditioning, illumination sequences, or machine learning to create algorithms created from training by other advanced imaging techniques.

Figure 1:
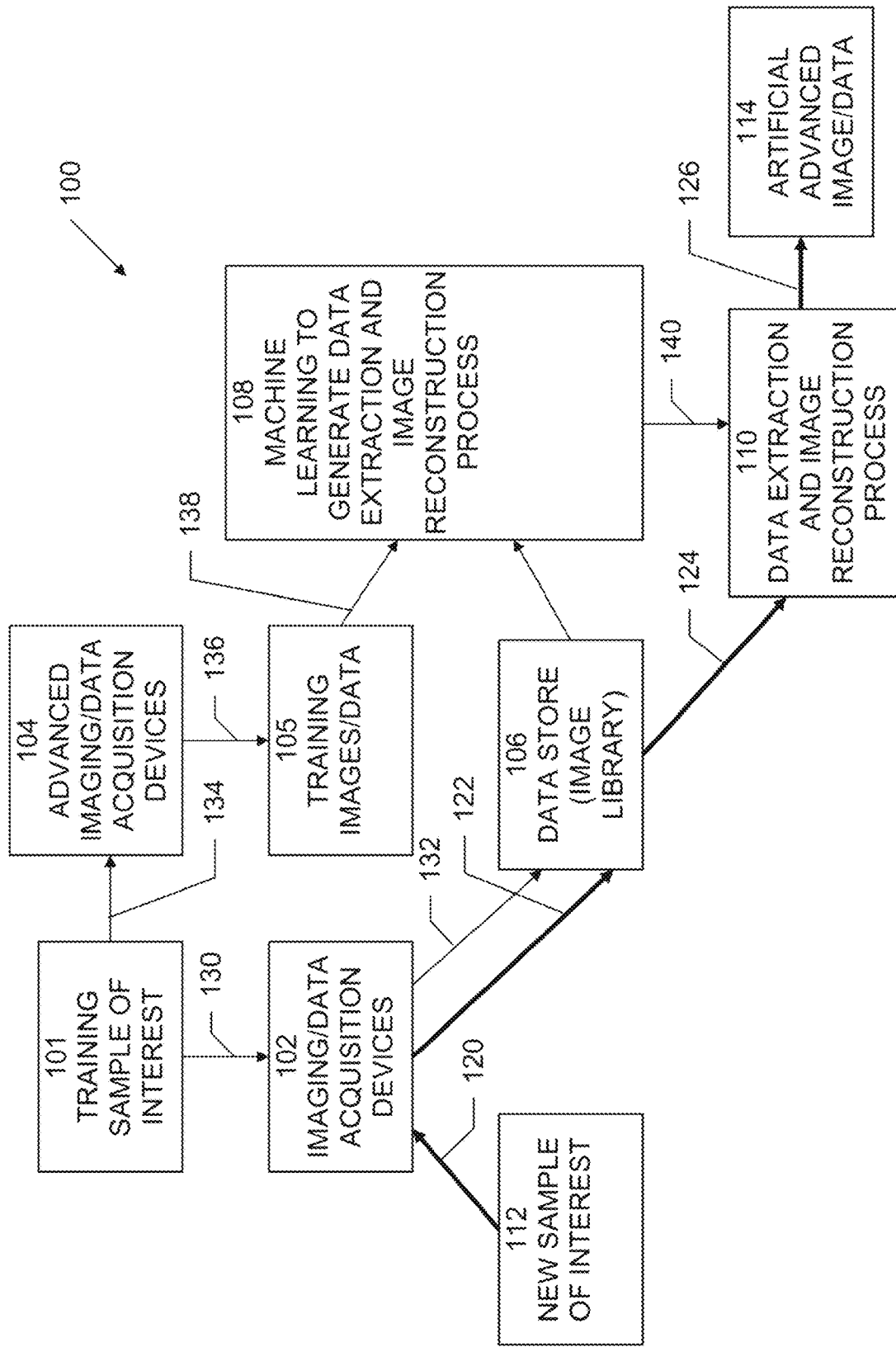
FIG. 1 illustrates an exemplary block diagram of an embodiment of an imaging system according to embodiments of the present systems and methods.

An exemplary block diagram of an embodiment of an imaging system 100 is shown in FIG. 1. In this example, system 100 may include one or more imaging/data acquisition devices 102, one or more advanced imaging/data acquisition devices 104, data store 106, and machine learning system 108. Imaging/data acquisition devices 102 may include one or more conventional imaging devices, such as light cameras (visible, infrared, ultraviolet, etc.) or other conventional data acquisition devices. For example, imaging device 102 may include a multi-condition light camera (MLC), described further below. For simplicity, in this document, an MLC may be used as an example of an imaging device/data acquisition 102. However, this is only an example. Imaging devices 102 may include other imaging devices, such as microscopes, cameras, telescopes, Terahertz images, magnetic resonance imaging devices, computed tomography devices, other tomography devices, electrocardiograph devices, electroterinograpy devices, seismographic devices, endoscopes, devices for examining a sample, physical sensors, such as strain sensors, pressure sensors, stress sensors, elastography sensors, temperature sensors, etc. Advanced imaging/data acquisition devices 104 may include, for example, devices such as confocal laser scanning microscopes (CLSM), which use a spatial pinhole to block out-of-focus light in image formation to increase optical resolution and contrast of a micrograph. Another example of an advanced imaging/data acquisition device 104 may include an optical coherence tomography device, which evaluates differences in coherence of reflected light from a tissue to a reference light and provides structural information of the retina along the same axis as the light source. Another example of an advanced imaging/data acquisition device includes microperimetry where data about tissue function is acquired and registered to an image. These imaging and data acquisition technologies are not restricted to just biological specimens. For example, advanced imaging/data acquisition devices 104 may include X-ray or radar devices for imaging structures, such as bridges, buildings, etc.

Data store 106 may include a database of data obtained using imaging/data acquisition devices 102 and advanced imaging/data acquisition devices 104, as well as using other image/data capture or generation technologies. For example, embodiments of the present systems and methods may use off-the-shelf or custom camera components to acquire a library of images 106 using illumination with differing characteristics (for example: color, direction, polarity). This image library may be called, for example, Multi-Light Condition (MLC) images.

Machine learning system 108 may include one or more machine learning models, such as a deep convolutional neural network (DCNN), which may be trained using data from advanced imaging/data acquisition devices 104 and used to generate data extraction and image reconstruction process, which may recreate or extract data or images similar to that obtained from advanced imaging/data acquisition devices 104 based on images/data obtained from imaging/data acquisition devices 102.

Figure 2:
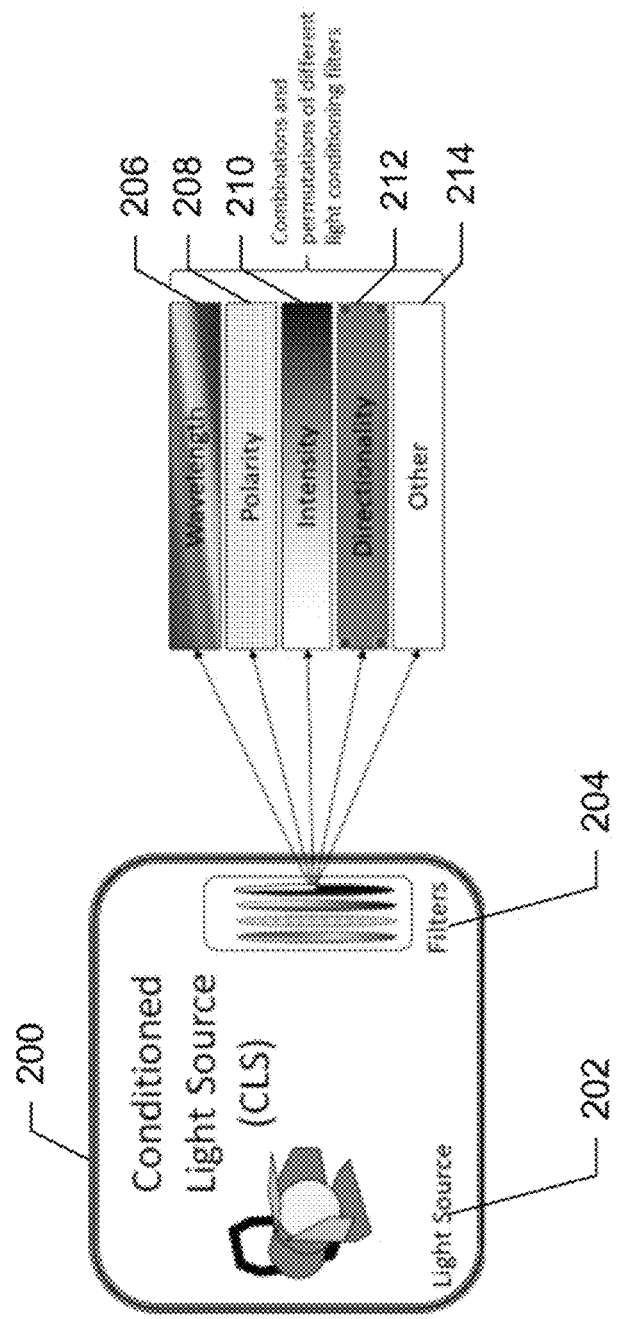
FIG. 2 illustrates an exemplary block diagram of an embodiment of a multi-condition light camera according to embodiments of the present systems and methods.

Imaging devices/data acquisition 102 may include one or more conventional imaging devices, such as light cameras (visible, infrared, ultraviolet, etc.). For example, imaging device/data acquisition 102 may include a multi-condition light camera, which may include one or more cameras capable of outputting light including multiple forms of conditioned light and capturing images using those multiple forms of conditioned light. For example, as shown in FIG. 2, a multi-condition light camera may include a conditioned light source 200, which may include one or more light sources 202 and a plurality of filters 204, which may be used to condition the light output from light source 202 to form a conditioned light output. Light source 202 may include sources of visible light, infrared light, ultraviolet light, etc. Examples of filters that may be included among filters 204 are wavelength or color filters 206, polarity or polarization filters 208, intensity filters 210, directionality filters 212, beam shaping, beam directing and other filters or other methods for conditioning light 214. Filters 204 may be utilized individually, or in any combination or permutation of multiple filters in order to generate the desired conditioned light output.

Figure 3:
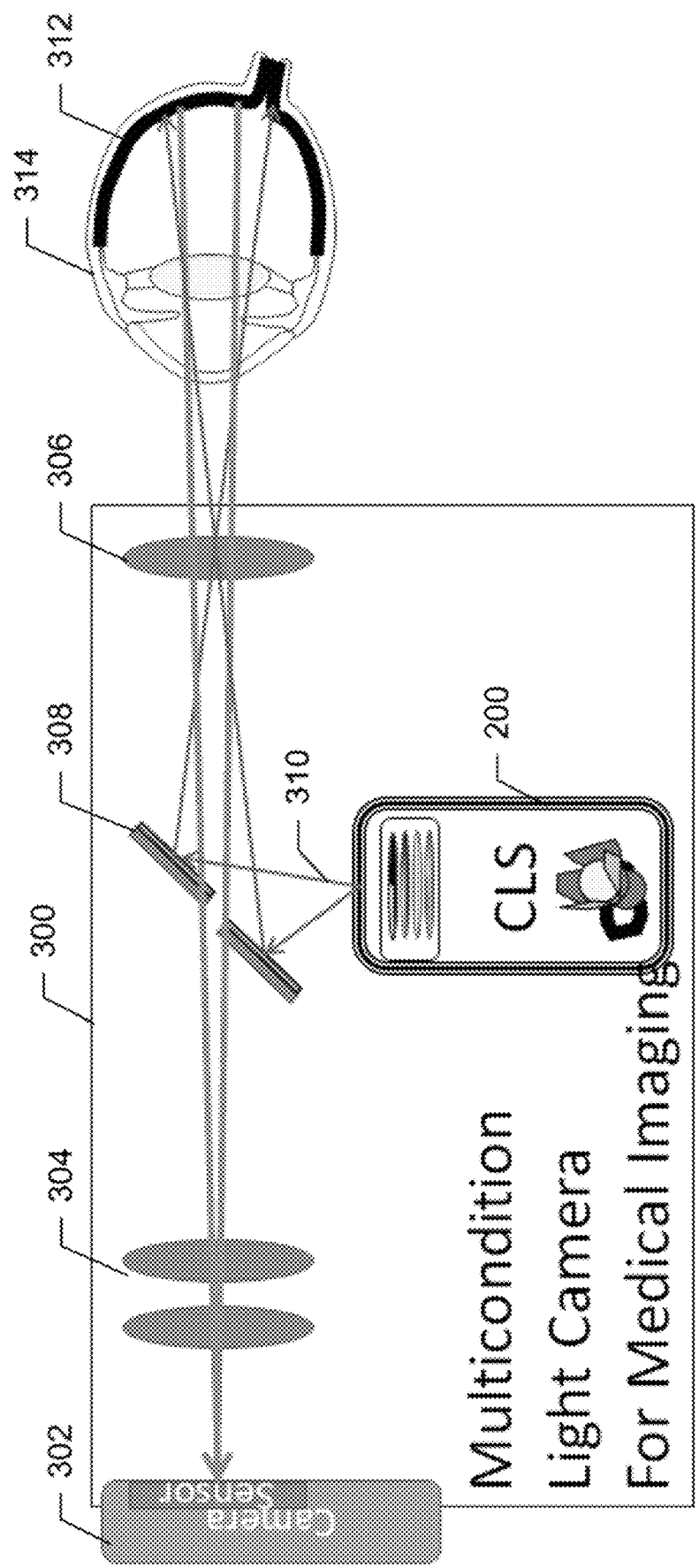
FIG. 3 illustrates an example of a multi-condition light camera 300 for medical imaging according to embodiments of the present systems and methods.

An example of a multi-condition light camera 300, as an example, for medical imaging is shown in FIG. 3. In this example, multi-condition light camera 300 includes conditioned light source 200, camera 302, and an optical system including lenses 304 and 306 and semi-reflective mirrors 308. Conditioned light source 200 may generate a conditioned light output 310, a portion of which may be reflected by semi-reflective mirrors 308, focused by lens 306, and applied to a sample, such as a tissue sample, which in this example, is the retina 312 of an eye 314. The light reflected from retina 312 may be input to the multi-condition light camera 300, focused by lenses 304 and captured and imaged by camera 302.

Figure 4:
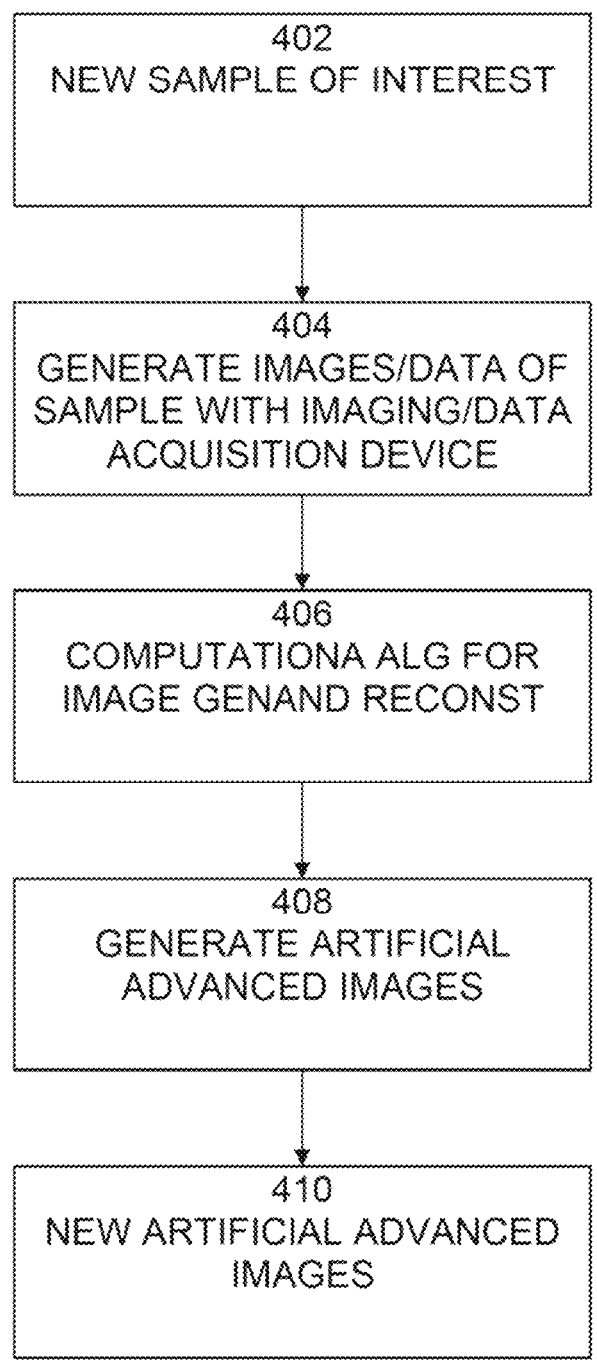
FIG. 4 illustrates an exemplary flow diagram of a process of imaging/data acquisition according to embodiments of the present systems and methods.

An exemplary flow diagram of a process of imaging/data acquisition 400 is shown in FIG. 4. It is best viewed in conjunction with FIG. 1. Process 400 may begin with 402, in which a new sample of interest 112 may be obtained. Such samples may be any physical object, substance, or structure. Examples may include, but are not limited to, tissue samples, biological entities, such as cells, animals, human patients, etc., structures, such as buildings, bridges, vessels, vehicles, aircraft, etc., or interstellar objects such as planets, stars, moons, *meteors*, etc. At 404, images of the sample, or other data relating to the sample, may be acquired 120 using imaging devices and/or data acquisition devices 102. For example, an imaging device 102 may include one or more Multi-Light Condition cameras, as described above. Likewise, data acquisition devices 102 may acquire data relating to various physical properties of the sample. At 404, at least one, but typically, a plurality of sets or streams of data relating to the sample, such as images of the sample, or other data relating to the sample, may be generated. At 406, the generated data may be used to access 122 data store 106 to find associated data, such as data related to similar types of samples in order to select, configure, or generate 124 a data extraction and image reconstruction process 110 for data and/or image generation and reconstruction. For example, in embodiments, in which data store 106 includes an image library, the associated images may be used to select or configure 124 data extraction and image reconstruction process 110 based on the types of images and/or samples. For example, if new sample 112 is a sample of a particular type of tissue, images of similar tissues samples may be found in data store (image library) 106. The generated data and/or images may also be added to data store (image library) 106. Likewise, for other types of data, data of similar type relating to similar types of samples may be found in data store 106.

The data associated types of samples, such as images, etc., may be used to select a data extraction and image reconstruction process 110 that has been generated for such samples types, or may be used to configure or generate a more general data extraction and image reconstruction process 110 specifically for such samples types. For example, where the data is images of tissue samples, the data associated with found images of similar tissue type samples may be used to selection or generate data extraction and image reconstruction process for such tissue type samples. In embodiments, data extraction and image reconstruction process 110 may include an artificial intelligence model or other artificial intelligence functionality. At 408, new artificial advanced images 114 (or other data) may be generated 126 by data extraction and image reconstruction process 110 from the images of the new sample of interest 112. For example, images of a particular tissue type sample that were generated using a Multi-Light Condition camera may be processed to generate artificial images similar to images that were generated by an advanced imaging/data acquisition device.

At 408, data extraction and image reconstruction process 110 may receive a "basic" dataset, such as an image or other dataset captured using an inexpensive imaging or data acquisition device or a limited imaging or data acquisition technique, and may generate one or more datasets or images 114 of the same subject that are similar to images of the subject if captured using an advanced imaging device or technique. For example, a data extraction and image reconstruction process may be produced using an advanced imaging/data acquisition device 104, such as an expensive scanning laser device. Training images 105 may be used to train machine learning model 108 and to generate an artificial intelligence model and imaging process 110. Then the data extraction and image reconstruction process may extract similar information as seen in the scanning laser image from the library of MLC images acquired with different lighting conditions on an inexpensive camera. The artificial intelligence model and process may then produce a new raw MLC dataset and generate similar imaging information as was produced by the training imaging modality. Accordingly, the MLC images may be used to recreate similar information as that acquired from the training imaging modality. It is noted that this is just an example, advanced data acquisition devices of all types may be used with the present systems and methods.

The overall benefit would be to use the most sophisticated imaging/data acquisition tools, which are often dependent upon lasers or other sophisticated energy sources, to "teach" simpler optical tools or data acquisition devices how to acquire the same type of data. The simpler tools may then be scaled down for portability, and become flexible enough to "learn" from any variety of sophisticated imaging tools which may be less scalable.

Figure 5:
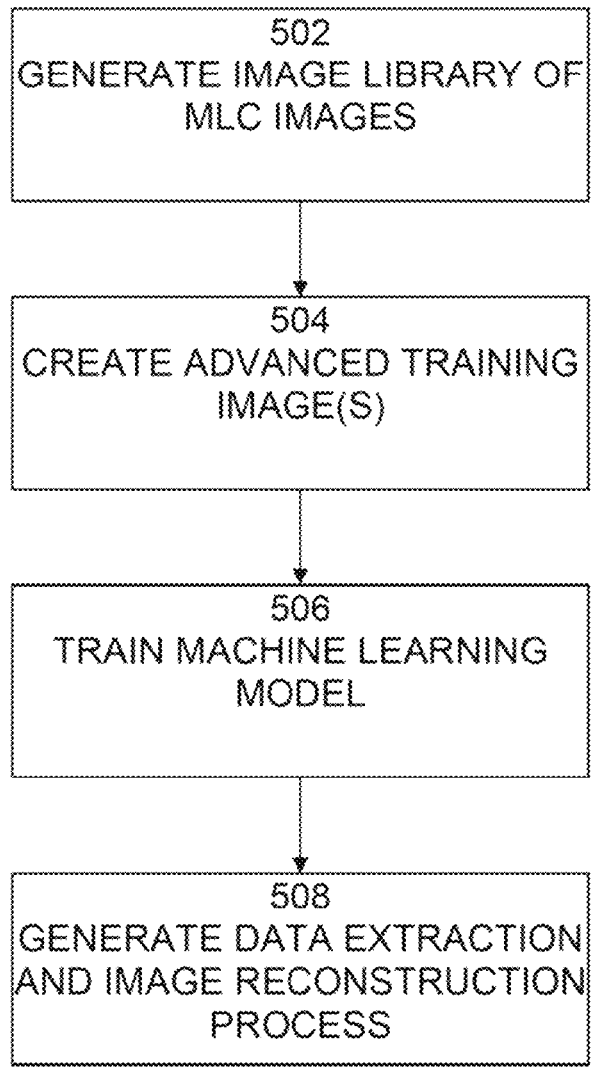
FIG. 5 illustrates an exemplary flow diagram of a process of generating an image library and artificial intelligence model and imaging process according to embodiments of the present systems and methods.

An exemplary flow diagram of a process 500 of generating data store 106 and data extraction and image reconstruction process 110 is shown in FIG. 5. It is best viewed in conjunction with FIG. 1. Process 500 may begin with 502, in which data store 106 may be generated using one or more training samples of interest 101. Such samples may be any physical object, substance, or structure. Examples may include, but are not limited to, tissue samples, biological entities, such as cells, animals, human patients, etc., structures, such as buildings, bridges, vessels, vehicles, aircraft, etc., or interstellar objects such as planets, stars, moons, meteors, etc.

Embodiments of the present systems and methods may use imaging devices/data acquisition devices 102, such as off-the-shelf or custom camera components to acquire 130 a plurality of datasets, such as images, of training samples of interest 101 using a variety of parameters, such as illumination with differing characteristics (color, direction, polarity). The datasets may be processed and stored in data store 106. For example, in the case of images, the images may be aligned, registered, and stored 132 in data store (image library) 106. For example, data store (image library) 106 may include Multi-Light Condition (MLC) images. For example, a camera may be used to capture 130 images of a sample under multiple lighting conditions, such as wavelength, intensity, polarization, direction, etc., in a relatively short period of time. These images may be used to create 132 libraries of images of the same sample under different lighting conditions. For example, if 7 wavelengths are used, under 5 light polarities, at 5 intensities, and 5 directions, this would create (7×5×5×5) 700 images of the sample.

At 504, for example, advanced imaging devices, such as scanning laser microscopes, may be used to acquire 134 structural and functional information and other data of the same or similar training samples of interest 101 to create 136 "training" images/data 105 that may not be otherwise not reproducible using conventional cameras or other data acquisition devices. Training images/data 105 may be processed to be compatible with the data in data store 106. For example, training images 105 from advanced imaging devices may be aligned and registered to the MLC images. At 506, training images/data 105 may be used to train 138 machine learning model 108, such as a deep convolutional neural network (DCNN), to extract the same information from data store 106 as may be obtained from advanced imaging/data acquisition devices 104. For example, training images 105 may be used to train 138 machine learning model 108, to extract the same information from image library 106 as seen in the training image from the library 106 of aligned and registered MLC images.

At 508, the machine learning technology 108 may create 140 data extraction and image reconstruction process 110 that may be applied to other data to reproduce data seen in training data, without the need for the device that was used to acquire the training data. For example, the acquired MLC images may be input to machine learning model 108, in which data from another imaging modality (for example, optical coherence tomography) was used as the training data, to create an independent data extraction and image reconstruction process 110 generated from machine learning model 108.

Figure 6:
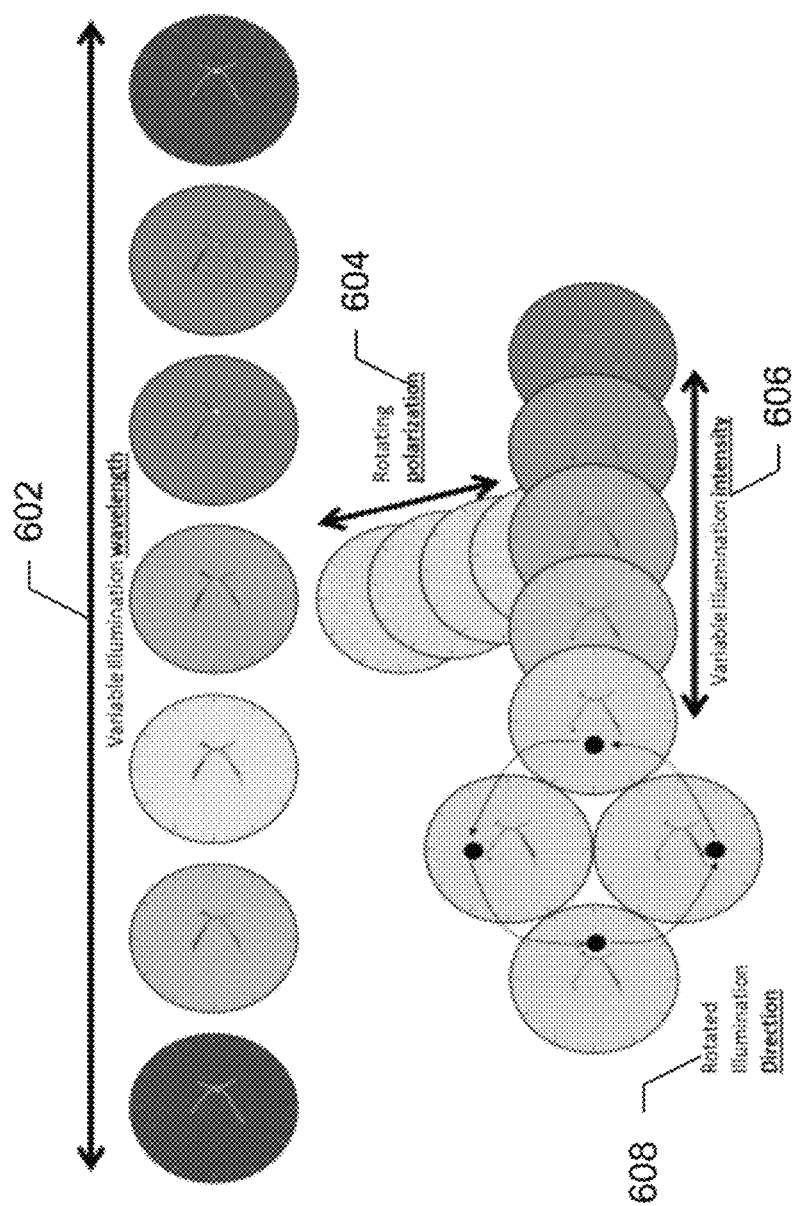
FIG. 6 illustrates an example of the present systems and method as applied to imaging of the retina according to embodiments of the present systems and methods.

FIG. 6 shows an example of the present systems and method as applied to imaging of the retina. It is to be noted that a similar approach may be used for imaging any sample, biological or not. As shown in FIG. 6, images may be captured, as at 402 of FIG. 4, using a variety of lighting conditions, such as variable illumination wavelength 602, rotating polarization 604, variable illumination intensity 606, rotated illumination direction 608, etc.

Figure 7:
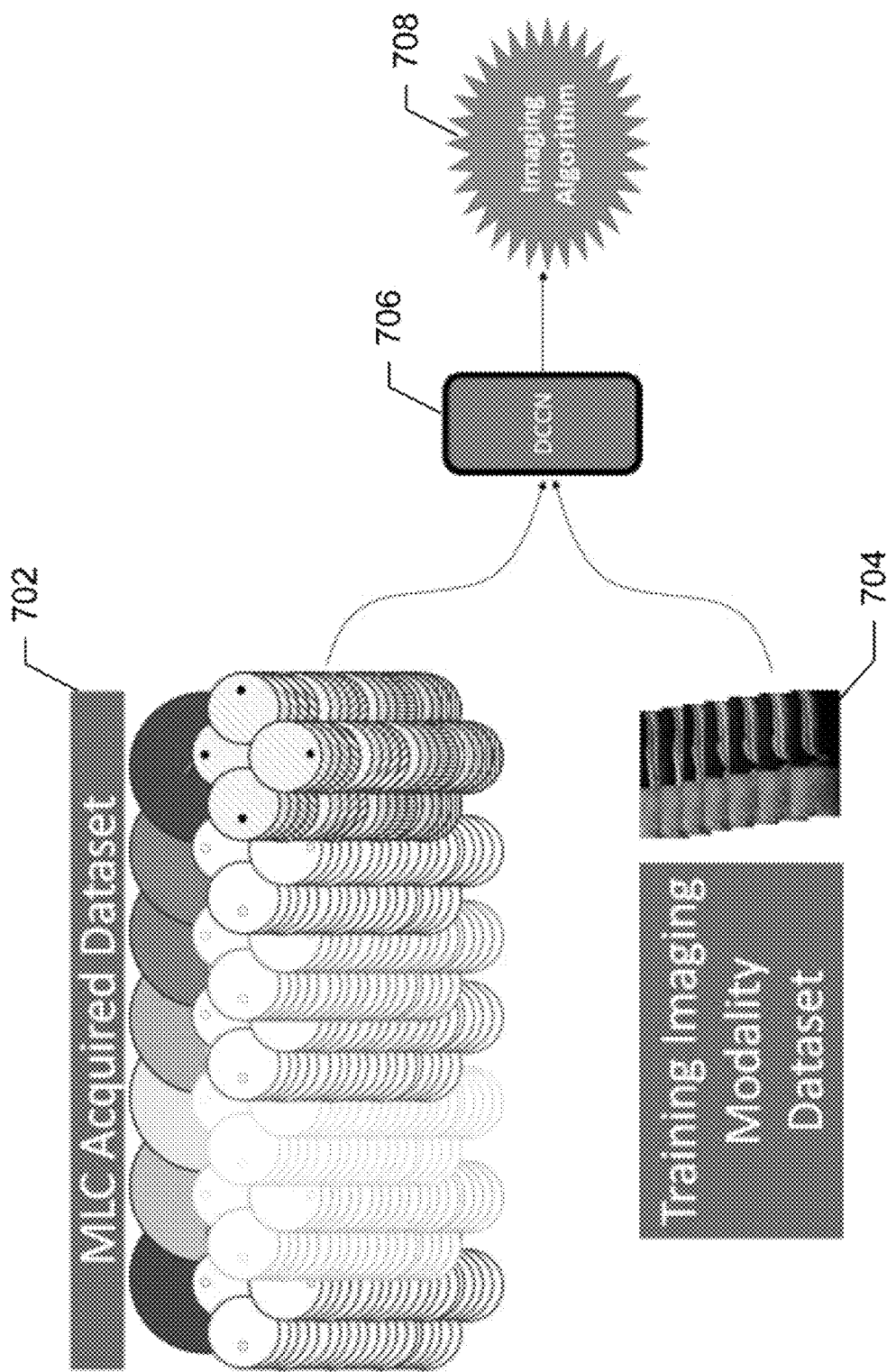
FIG. 7 illustrates an example of processing of a library of MLC images according to embodiments of the present systems and methods and using advanced imaging data to generate a data extraction and image reconstruction process that is capable of extracting data and reconstructing an image similar to that acquired by an advanced imaging device.

FIG. 7 shows an example of processing of a library of MLC images 702 produced by the example shown in FIG. 5. As shown in this example, library of MLC images (MLC Acquired Dataset) 702 and advanced training images (Training Imaging Modality Dataset) 704 may be input to machine learning model 706, such as a DCNN, to generate artificial intelligence model and process (Imaging Algorithm) 708, which may extract data from the MLC images that is necessary to generate images similar to the training images 704.

Figure 8:
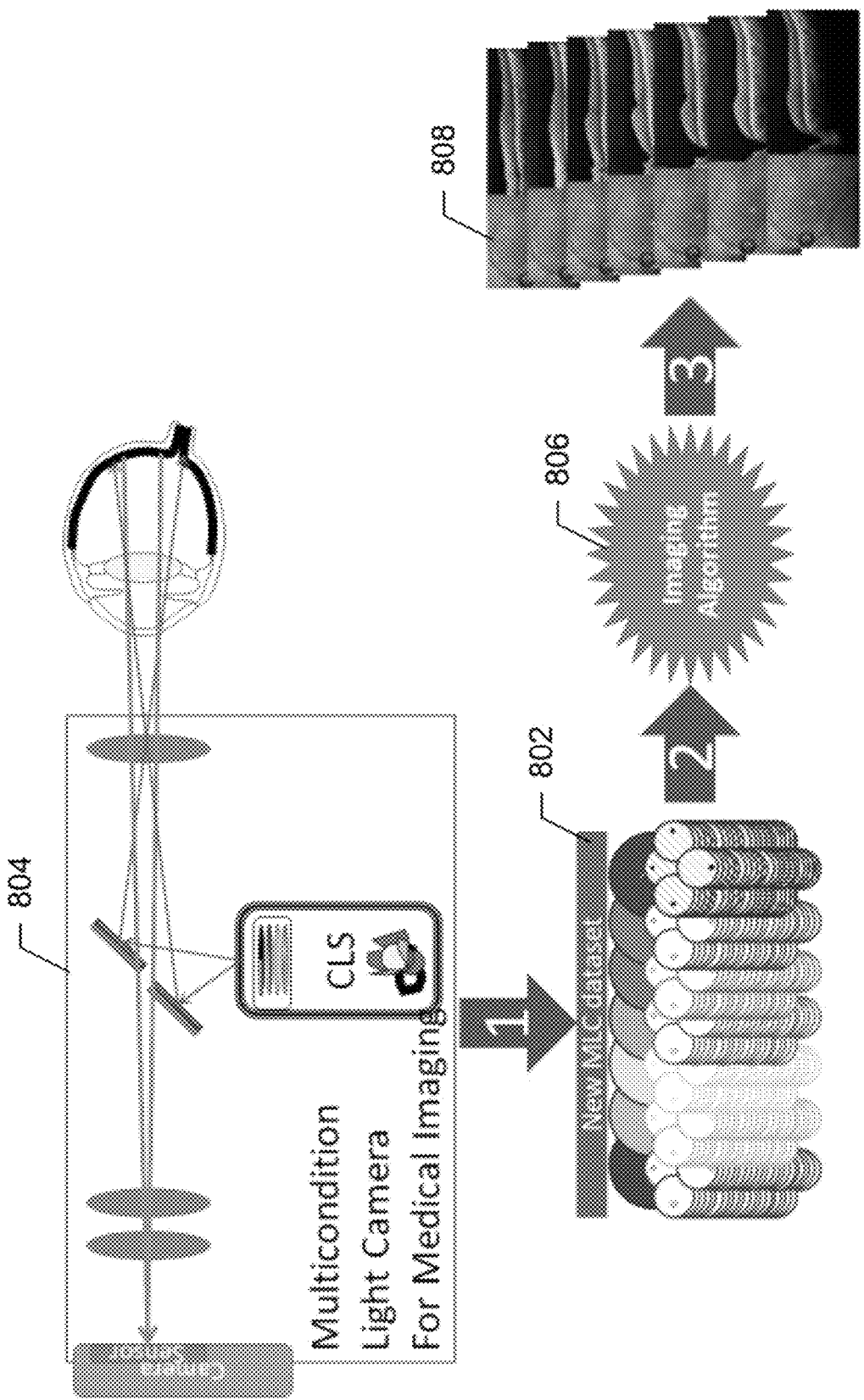
FIG. 8 example of how MLC images acquired of other samples using the data extraction and image reconstruction process trained by a multi-condition light camera to reproduce images acquired by advanced imaging technologies according to embodiments of the present systems and methods.

FIG. 8 shows an example of how MLC images 802 acquired of other samples using the camera 804 may be input to the imaging algorithm 806 to reproduce images 808 acquired by other imaging technologies.

Figure 9:
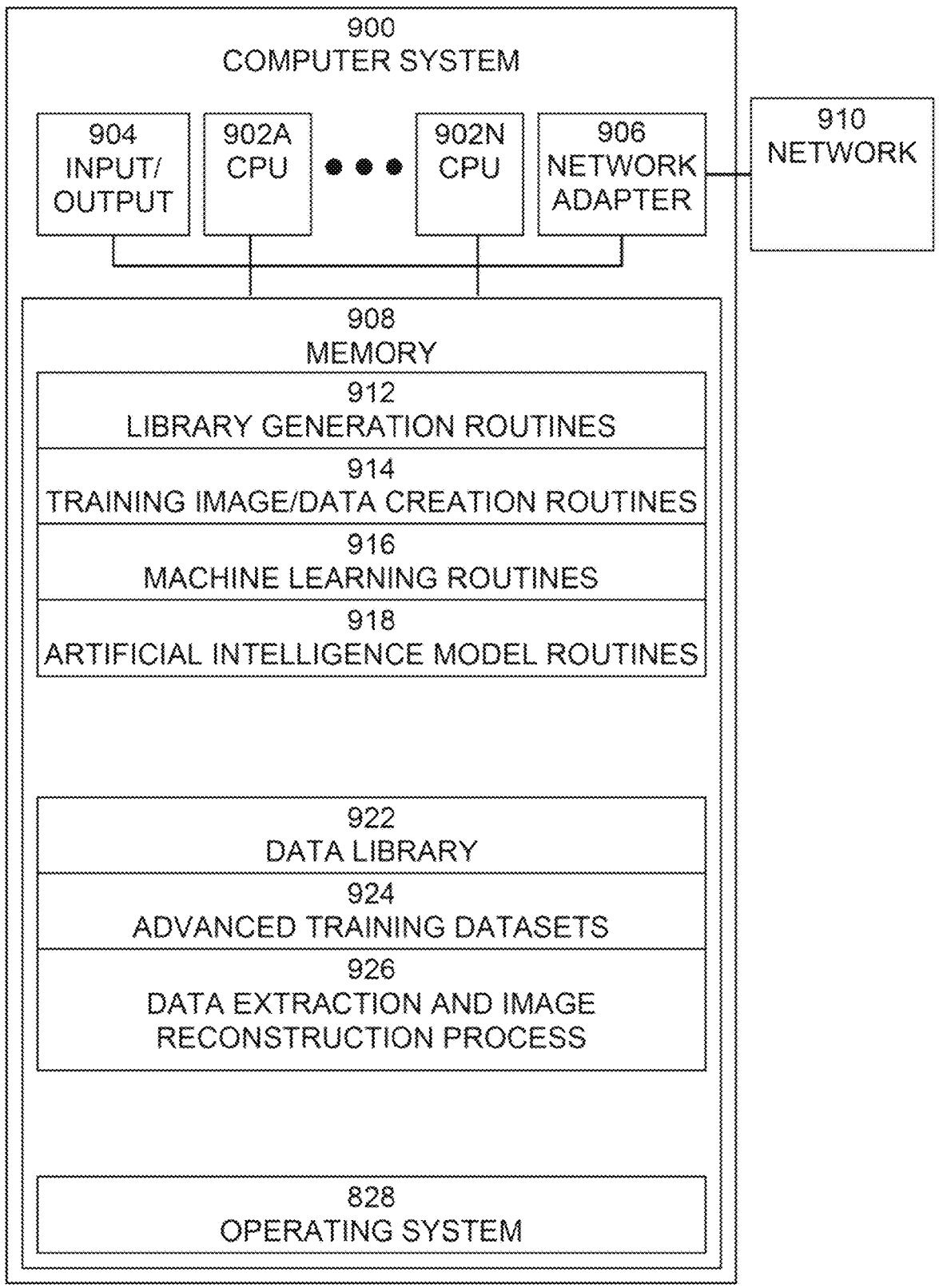
FIG. 9 is an exemplary block diagram of a computer system in which processes involved in the embodiments described herein may be implemented.

An exemplary block diagram of a computer system 900, in which processes involved in the embodiments described herein may be implemented, is shown in FIG. 9. Computer system 900 may be implemented using one or more programmed general-purpose computer systems, such as embedded processors, systems on a chip, personal computers, workstations, server systems, and minicomputers or mainframe computers, or in distributed, networked computing environments. Computer system 900 may include one or more processors (CPUs) 902A-902N, input/output circuitry 904, network adapter 906, and memory 908. CPUs 902A-902N execute program instructions in order to carry out the functions of the present communications systems and methods. Typically, CPUs 902A-902N are one or more microprocessors, such as an INTEL CORE® processor. FIG. 9 illustrates an embodiment in which computer system 900 is implemented as a single multi-processor computer system, in which multiple processors 902A-902N share system resources, such as memory 908, input/output circuitry 904, and network adapter 906. However, the present communications systems and methods also include embodiments in which computer system 900 is implemented as a plurality of networked computer systems, which may be single-processor computer systems, multi-processor computer systems, or a mix thereof.

Input/output circuitry 904 provides the capability to input data to, or output data from, computer system 900. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 906 interfaces device 900 with a network 910. Network 910 may be any public or proprietary LAN or WAN, including, but not limited to the Internet.

Memory 908 stores program instructions that are executed by, and data that are used and processed by, CPU 902 to perform the functions of computer system 900. Memory 908 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 908 may vary depending upon the function that computer system 900 is programmed to perform. In the example shown in FIG. 9, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 9, memory 908 may include library generation routines 912, training image/data creation routines 914, machine learning routines 916, artificial intelligence model routines 918, data library 922, advanced training image(s) 924, data extraction and image reconstruction process 926, and operating system 928. Library generation routines 912 may include software routines to acquire a library of data with varying parameters, such as images using illumination with differing characteristics (color, direction, polarity), and to align, register, and store the images in data library 922, as described above. Training image/data creation routines 914 may include software routines to acquire structural, functional, and other data relating of a sample to create one or more advanced training datasets 924 that may not be otherwise not reproducible using conventional imaging or data acquisition devices, such as cameras, as described above. Machine learning routines 916 may include software routines to generate a machine learning model and perform machine learning, as described above. Artificial intelligence model routines 918 may include software routines to create a data extraction and image reconstruction process 926 and process that may be applied to other data, such as MLC images, to reproduce data seen in training images/data, without the need for the device used to acquire the training images/data, as described above. Operating system 920 may provide overall system functionality.

As shown in FIG. 9, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for generating an image comprising:
   acquiring a first plurality of images of at least one training object by a multi-condition light camera using at least two forms of conditioned light, the at least two forms of conditioned light comprising three different intensities of light of a same wavelength, three different wavelengths of light of each of the three different intensities, and three different directions of light using the three different wavelengths or three different directions of light using each of the three different intensities of light;
   acquiring a second plurality of images of the at least one training object using an advanced imaging device, the second plurality of images having additional information relative to the first plurality of images, the advanced imaging device having an imaging modality different from that of the multi-condition light camera;
   training a machine learning model, using the first plurality of images and the second plurality of images, to extract the additional information;
   developing an image reconstruction process, using the machine learning model, to receive a selected image of an object obtained by the multi-condition light camera and to generate an output image including the additional information;
   obtaining the selected image of a new object by the multi-condition light camera; and
   generating, from the obtained selected image of the new object, using the image reconstruction process, a selected output image including the additional information.

2. The method of claim 1, wherein the at least two forms of conditioned light comprise at least two of visible light, infrared light, or ultraviolet light, and the light has been filtered or conditioned using at least one of a wavelength filter, a color filter, a polarity filter, a polarization filter, an intensity filter, a directionality filter, light shaping, and light beam directing.

3. The method of claim 2, wherein the advanced imaging device comprises at least one of a planar imaging device, a 3D imaging device, a tomography device, an x-ray device, a magnetic resonance imaging device, a confocal laser scanning microscope, an optical coherence tomography device, an ultrasound device, an adaptive optics device, a fluorescence imaging device, a functional magnetic resonance imaging device, an angiography device, a visual function testing device, a perimetry device or a functional imaging device.

4. The method of claim 3, further comprising aligning, registering, and storing the first plurality of images and the second plurality of images.

5. A system for generating an image comprising:
   a multi-condition light camera adapted to capture an image of an object using at least two forms of conditioned light, comprising three different intensities of light of a same wavelength three different wavelengths of light of each of the three different intensities, and three different directions of light using the three different wavelengths or three different directions of light using each of the three different intensities of light;
   an advanced imaging device having an imaging modality different from that of the multi-condition light camera, and
   a computer system comprising a processor, memory accessible by the processor, and computer program instructions and data stored in the memory so as to enable the processor to implement:
      acquiring a first plurality of images of at least one training object by the multi-condition light camera, each image of the first plurality of images using the at least two forms of conditioned light;
      acquiring a second plurality of images of the at least one training object by the advanced imaging device, the second plurality of images having additional information relative to the first plurality of images;
      training a machine learning model, using the first plurality of images and the second plurality of images, to extract the additional information;
      developing an image reconstruction process, using the machine learning model, to receive a selected image of an object obtained by the multi-condition light camera and to generate an output image including the additional information;
      obtaining the selected image of a new object by the multi-condition light camera; and
      generating, from the obtained selected image of the new object, using the image reconstruction process, a selected output image including the additional information.

6. The system of claim 5, wherein the at least two forms of conditioned light comprise at least two of visible light, infrared light, or ultraviolet light, and the light has been filtered or conditioned using at least one of a wavelength filter, a color filter, a polarity, a polarization filter, an intensity filter, a directionality filter, light shaping, and light beam directing.

7. The system of claim 6, wherein the advanced imaging device comprises at least one of a planar imaging device, a 3D imaging device, a tomography device, an x-ray device, a magnetic resonance imaging device, a confocal laser scanning microscope, an optical coherence tomography device, an ultrasound device, an adaptive optics device, a fluorescence imaging device, a functional magnetic resonance imaging device, an angiography device, visual function testing device, a perimetry device or a functional imaging device.

8. The system of claim 7, further comprising aligning, registering, and storing the first plurality of images and the second plurality of images.

9. A system for creating artificial images comprising:

a multi-condition light camera adapted to output a plurality of lighting conditions and to capture an image using the plurality of lighting conditions, comprising at least two forms of conditioned light comprising three different intensities of light of a same wavelength, three different wavelengths of light of each of the three different intensities, and three different directions of light using the three different wavelengths, or three different directions of light using each of the three different intensities of light;

an advanced image acquisition device having an imaging modality different from that of the multi-condition light camera, wherein an image acquired by the advanced image acquisition device has additional information compared to the image acquired by the multi-condition light camera;

a computer;

the multi-condition light camera, the advanced image acquisition device, and the computer configured together to perform a method comprising:

acquiring a first plurality of training images of an object by the multi-condition light camera, wherein the object is illuminated by the plurality of lighting conditions;

acquiring a second plurality of training images of the object by the advanced image acquisition device;

training, at the computer, a machine learning model, using as training data the first plurality of images of the object and the second plurality of images of the object, to develop an image reconstruction process, wherein the image reconstruction process takes a selected image of the object acquired by the multi-condition light camera and outputs an artificial image of the selected object, wherein the artificial image mimics the image which the advanced image acquisition device would have taken of the object;

acquiring an image of a new object by the multi-condition light camera;

generating an artificial image of the new object by applying the image reconstruction process to the image of the new object acquired by the multi-condition light camera; and displaying the artificial image of the new object to a user.

10. The system of claim 9, wherein the plurality of lighting conditions comprises at least one wavelength of light in the range of approximately 10 nm to approximately 1 mm.

11. The system of claim 9, wherein the plurality of lighting conditions is achieved by using light that has been filtered using at least one of a wavelength filter, a color filter, a polarity filter, a polarization filter, an intensity filter, or a directionality filter.

12. The system of claim 9, wherein the multi-condition light camera comprises a conventional camera.

13. The system of claim 9, wherein the advanced image acquisition device comprises at least one of a planar imaging device, a 3D imaging device, a tomography device, an x-ray device, a magnetic resonance imaging device, a confocal laser scanning microscope, an optical coherence tomography device, an ultrasound device, an adaptive optics device, a fluorescence imaging device, a functional magnetic resonance imaging device, an angiography device, visual function testing device, a perimetry device or a functional imaging device.

* * * * *